UNITED STATES PATENT OFFICE.

CHARLES A. SEELY, OF NEW YORK, N. Y.

IMPROVED METHOD OF CONVEYING AND USING HEAT IN CHEMICAL AND OTHER SIMILAR PROCESSES.

Specification forming part of Letters Patent No. 87,208, dated February 23, 1869.

*To all whom it may concern:*

Be it known that I, CHARLES A. SEELY, of New York, in the county of New York, in the State of New York, have invented a new and Improved Mode of Conveying Heat; and I do hereby declare that the following is a full and exact description thereof.

The nature of my invention consists in the use of substances which have a higher boiling-point than that of water as a medium for the conveyance of heat, the said substances being contained in an apparatus operating on the same principles as the ordinary hot-water-circulating apparatus used for warming buildings.

To enable others skilled in the art to use my invention, I proceed to describe it with more exactness.

The ordinary hot-water-circulating apparatus, although quite suitable and efficient for warming buildings, is practically unadapted to purposes where a temperature above the boiling-point of water is required.

The circulating apparatus of Perkins, in which the water is confined under pressure, although capable of being raised to a high temperature, is quite objectionable, and has not come into use in consequence of the danger of explosion. But I have found that paraffine and other substances which have a high boiling-point may be used in the circulating apparatus, and circulate freely while near the point of boiling, without any increase of pressure on the apparatus. Thus paraffine, which boils at, say, 700° Fahrenheit, is capable of conveying a heat of 700°, and can be made to circulate at any temperature between that and the temperature of boiling water. Instead of paraffine I can use wax, spermaceti, and oils of high boiling-points generally. The choice between these would be determined by the temperature desired, the cost of the circulating medium, &c. I prefer paraffine generally for the reason of its high boiling-point, and the fact that it is not decomposed or injured by the heat.

My invention consists in the use of paraffine and other substances of high boiling-points in a circulating apparatus in the place of water, and I do not limit myself to any kind or form or use of the apparatus; but I think it well to allude to some of the forms and uses of the apparatus for which my invention is specially suitable, and for which the ordinary apparatus is wholly impracticable: first, where the heat is to be delivered from the surface of a plate or pan in certain chemical processes when the requisite temperature is above 212°, as in the manufacture of dextrine and oxalic acid, &c; second, when the apparatus is used for culinary purposes, as for the baking of bread, roasting of meats, &c., in which apparatus the hot liquid circulates about the oven; third, when liquids are to be distilled whose boiling-points are above 212°, as, for example, petroleum or coal oils and sulphuric acid. In this last case, as in evaporations generally, the delivering part of the apparatus may be in the form of a coil.

What I claim, and desire to secure by Letters Patent, is—

The use of paraffine and other substances of high boiling-points in the manner and for the purposes described.

CHARLES A. SEELY.

Witnesses:
CHARLES J. EAMES,
MICHAEL J. HAVILAND.